July 13, 1965  A. GONELLA ETAL  3,194,256
VALVE REPAIR DEVICE
Filed Sept. 28, 1961
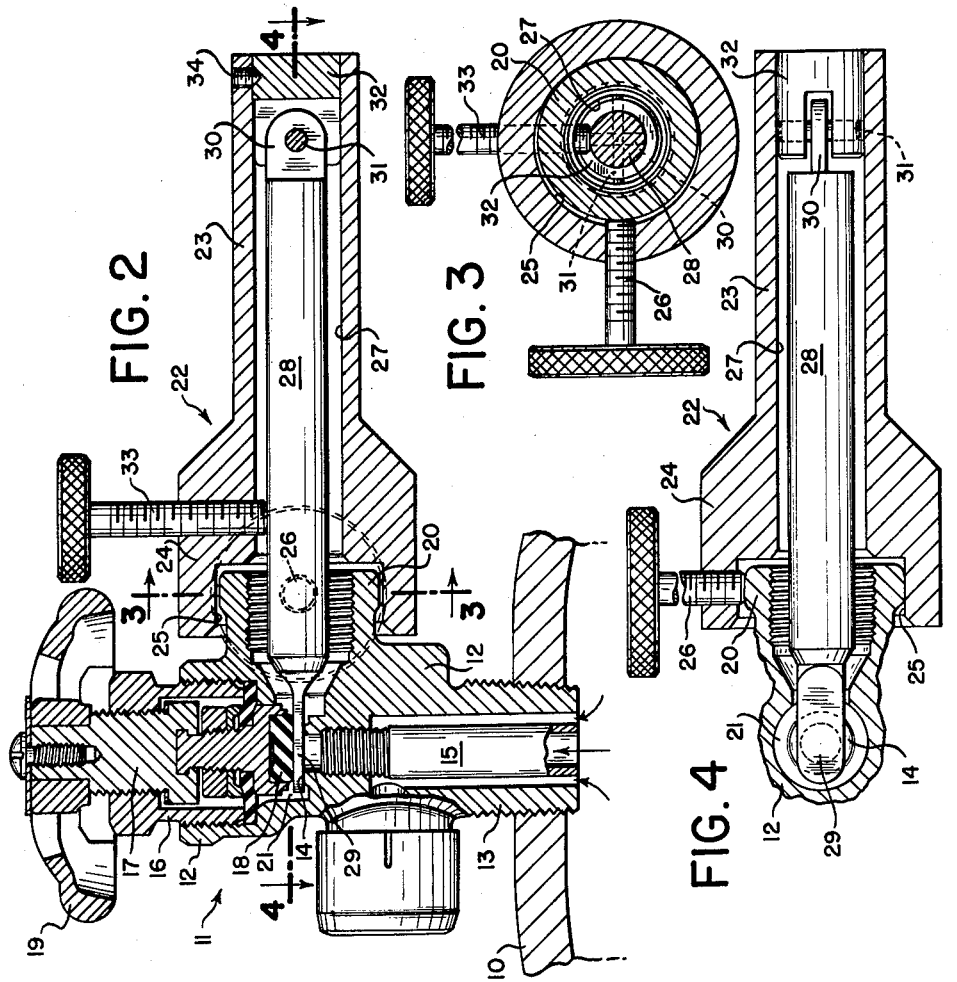
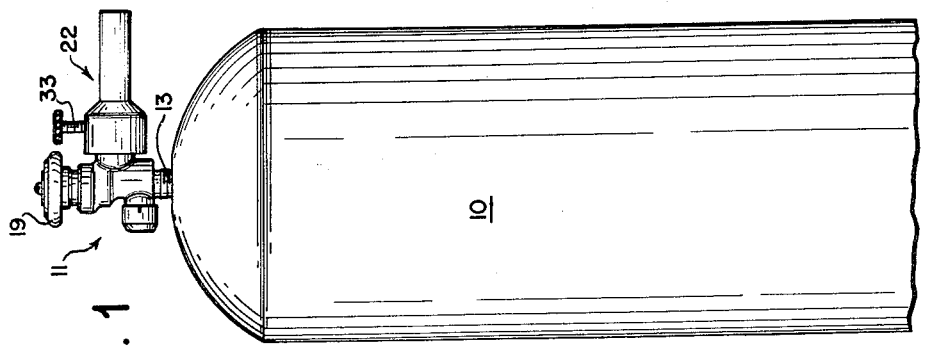
INVENTORS
AMEDIO GONELLA
ALBERT F. LANDRY
BY
ATTORNEYS 3,194,256
VALVE REPAIR DEVICE
Amedio Gonella, Sagamore, and Albert F. Landry, Buzzards Bay, Mass., assignors to Suburban Propane Gas Corporation, Whippany, N.J., a corporation of New Jersey
Filed Sept. 28, 1961, Ser. No. 141,501
2 Claims. (Cl. 137—315)

This invention relates to a valve repair device, or more accurately to a device to aid in the repair of valves, particularly those used on containers for gas under pressure and especially liquefied petroleum gas.

The valves used for controlling the flow of gas from cylinders or other containers are of a more or less standard construction and, generally speaking, comprise a body having an inlet portion which is threaded into an opening in one end of the cylinder, this inlet portion having a central passage which terminates in a valve seat. The valve body also has an outlet passage which is internally threaded for connection to the gas conveying pipe or tube. The valve is provided with a bonnet assembly which is a screw threaded into the valve body. This assembly includes a valve member or disk at its lower end, a threaded portion thereabove, and an operating handle at its upper extremity.

Cylinders of liquefied petroleum gas are apt to receive rough handling, and even though their valves are of rugged construction, mechanical repair of the valve bonnet assemblies is required from time to time. The procedure for such repair at present is to depressurize the cylinder to atmospheric pressure in order to remove the bonnet assembly and recondition or replace it. This procedure results in wastage of gas, is apt to produce a fire hazard and is time consuming.

The purpose of the present invention is to reduce such hazard and wastage of gas and to reduce the reconditioning time. In accordance with the invention a device has been devised which comprises a casing arranged to be secured firmly to the valve body. A chamber extends into the casing and has loosely secured therein a control member, conveniently rod-like in form and having a tongue portion which projects from the casing.

When it is desired to apply this device to the valve of a gas container which needs repair, the valve is opened and the tongue of the repair device is inserted through the outlet opening of the valve and into position between the valve seat and valve disk. Thereupon the valve handle is turned to force the valve disk against the upper surface of the tongue and thereby force the tongue against the valve seat and close off the escaping gas. This requires only a few seconds and results in the escape of a comparatively small amount of gas.

The next step in the operation of the device is to turn down a clamping screw which is provided on the device and which, in addition to the force of the valve disk, serves to hold the tongue against the valve seat. A second screw or other clamping means is actuated to secure the casing firmly to the valve body. After this, the handle of the valve can be turned to remove the bonnet assembly, and the necessary repairs can then be made, such for example, as renewing the valve disk or repairing the valve stem, etc. During this repair time the tongue of the device applied to the valve serves in place of the disk to hold the valve closed and prevent the escape of gas.

When it is desired to replace the repaired valve parts, the bonnet is first screwed into the valve body but with the valve stem rotated to leave the valve disk free of the surface of the tongue. Then the two screws of the repair device are loosened, the device is removed from the valve and the valve handle again turned to reclose the valve. Here also only a small amount of gas escapes.

The invention will be better understood after examining the accompanying drawings and the detailed description following:

In these drawings,

FIG. 1 is a view of the upper portion of a gas cylinder with valve in place and with our improved device applied to the valve;

FIG. 2 is an enlarged view in vertical central section of the valve and device and showing a fragment of the top of the gas cylinder;

FIG. 3 is a section taken on line 3—3 of FIG. 2; and

FIG. 4 is a section taken on line 4—4 of FIG. 2.

The gas container or cylinder 10 has a conventional valve fitted to its upper end and indicated generally by reference numeral 11. Cylinder 10 is of the type which is in more or less general use in the distribution of liquefied petroleum gas, and valve 11 as shown is of a construction which has been approved by the Interstate Commerce Commission for use on such gas containers.

Referring to FIG. 2, valve 11 has a body 12 which is provided with a tapered inlet portion 13 extending downwardly from its lower end and threaded into an aperture in the upper wall of cylinder 10. Midway of valve body 12 there is a valve seat 14 which has at the upper end a central passage that includes a tube 15 that extends to the lower extremity of inlet portion 13 and conveys the gas from the cylinder interior to the valve seat.

The upper portion of valve body 12 is internally threaded to receive a bonnet assembly 16 which includes a valve stem 17 in threaded engagement with the bonnet and having a valve disk 18 at its lower end and an operating handle 19 at its upper end. At one side of the valve there is an outlet projection 20 having an internally threaded passage by which the valve is connected to the distributing pipe or tube (not shown) for conveying the gas from the cylinder to the point of consumption. This passage extends inwardly of valve casing 12 and connects with a valve chamber 21 which surrounds valve seat 14.

The present invention includes the device indicated generally by reference numeral 22 which comprises an elongated casing 23 having an enlargement 24 at its left end which is provided with a central recess 25 dimensioned to fit over the outlet projection 20 of the valve body. A clamping screw 26 is threaded into an aperture on one side of enlargement 24 and provided with a knurled head. By means of screw 26 the device can be firmly secured to the valve body 12 by clamping engagement with the outlet projection 20.

Casing 23 is tubular or hollow and has an elongated internal opening or chamber 27 which is conveniently cylindrical in cross-section. Arranged within this chamber 27 there is a control member 28 in the form of a rod which may be of any desired cross-section but which also is conveniently round and which has a flat tongue portion 29 projecting from its left end. Tongue portion 29 may be integral with rod 28 or may be made separately and secured to it in any desired manner. Tongue 29 is of sufficient width to cover and close valve seat 14, as indicated in FIG. 4, and it is of sufficient length to extend somewhat beyond the inner side of the valve seat when device 22 is mounted on the outlet projection 20 as previously described.

Control member 28 is connected at its outer or right hand end to casing 23 in any suitable manner and as indicated it has a flattened end portion 30 which is apertured to receive a pin 31 mounted in the inner end of a slotted plug 32 which is held in position in the outer end of casing 23 by means of a locking screw 34.

A second clamping screw 33 similar to screw 26 is threaded into an aperture in the enlargement 24 of the casing at right angles to the plane of the tongue portion 29 of the control rod. The inner end of screw 33 can be turned against control member 28 in a manner about to be described.

When it is desired to apply the valve repair device 22 to a valve 11 which is in need of reconditioning, the handle 19 of the valve is first turned to open the valve and raise valve disk 18 away from valve seat 14. The extent of this movement will be sufficient to permit the insertion of the tongue portion 29 of device 22. The opening of the valve permits gas to escape from the cylinder, but the repair device can be grasped by the hand and its tongue 29 quickly inserted through the outlet opening within outlet portion 20 so as to cover valve seat 14, and the handle 19 again manipulated to cause the valve disk 18 to bear upon the upper side of the flat tongue 29 so as to force the tongue against the valve seat to cut off further flow of gas.

This being done the clamping screw 26 is turned into clamping engagement with the outlet projection 20 so that device 22 is firmly mounted on or attached to valve 11. Then clamping screw 33 is turned inwardly so that its inner end engages the adjacent surface of control rod 28 and maintains tongue 29 tightly held against the valve seat 14. This enables the valve handle 19 to be turned in the opposite direction until the bonnet assembly is removed including bonnet 16, the handle 19, valve stem 17 and valve disk 18. With this accomplished, it is an easy matter either to replace the bonnet assembly with a new one, if this is required, or to replace valve disk 18, or to rethread valve stem 17 or bonnet 16, or accomplish whatever other repairs may be needed in connection with the bonnet and valve disk assembly.

It will be understood that the internal dimension of chamber 27 in the direction of movement of the control member 28 is sufficient to permit the insertion of tongue 29 between the valve seat 14 and valve disk 18 when the valve is open, without interfering with the application of the recess 25 to the exterior of outlet projection 20. During this procedure it will of course be assumed that the locking screw 33 is operated to withdraw its inner end to the neighborhood of the ceiling of the chamber 27.

Device 22 which we have provided permits the closing off of flow from a valve of the type of valve 11 and prevents the escape of gas from the valve while the bonnet assembly parts of the valve are being repaired or reconditioned. In fact, even should the threads of the valve stem 17 or their cooperating threads in bonnet 16 be so worn that it should be impossible to hold the tongue 29 against seat 14 as above described, the device 22 may be manipulated to apply the tongue 29 to the valve seat, and turn up the two screws 26 and 33 and thereby cut off the gas flow through the valve. In other words, even with the bonnet assembly completely removed from valve 11, device 22 can be applied to the valve in such a manner as to cut off the flow of gas from the cylinder 10.

Although gas is escaping under full pressure during the few seconds that the device 22 is being applied to and removed from valve 11, the procedure which employs this device is considered much safer than the present procedure where the gas container must be completely emptied and depressurized to atmospheric pressure in order to recondition the valve. The new procedure also reduces the valve reconditioning time from a matter of hours (for tanks of large capacity, larger than tank 10) to only a few minutes. This difference in time is in eliminating the need to empty the contents of and depressurizing the container.

We claim:

1. The combination with a valve comprising a valve body having an outlet opening and a flow passage to the outlet, a valve seat arranged in the flow passage, a valve member and means operatively associated with the valve body to urge the valve member against the valve seat to close the valve, of a device applicable to the valve body through the outlet opening to facilitate repair of the valve, such device comprising a casing having means thereon for removably securing it to the valve body, said casing having a chamber extending into the casing from one end, a rod-like control member having a tongue at one end and pivotally mounted at its opposite end within the casing, the tongue projecting beyond the casing a sufficient distance to cover the valve seat when the valve is open and when the casing is secured to the valve body, and clamping means on the device acting on the control member to hold the tongue against the valve seat thus to close the flow passage while the valve is being repaired.

2. The combination with a valve comprising a valve body having an outlet opening and a flow passage to the outlet, a valve seat arranged in the flow passage, a valve member and means operatively associated with the valve body to urge the valve member against the valve seat to close the valve, of a device applicable to the valve body through the outlet opening to facilitate repair of the valve, such device comprising an elongated hollow casing having means thereon for removably securing it to the valve body, said casing being open at one end and closed at the other end, a rod-like control member having movement within the hollow casing at right angles to its axis and having a tongue projecting beyond the open end of the casing a sufficient distance to cover the valve seat when the valve is open and when the casing is secured to the valve body, and clamping means on the device acting on the control member to hold the tongue against the valve seat thus to close the flow passage while the valve is being repaired.

References Cited by the Examiner

UNITED STATES PATENTS

| 218,399 | 8/79 | Post | 137—329.01 |
|---|---|---|---|
| 760,710 | 5/04 | Simpson | 285—404 XR |
| 930,635 | 8/09 | Warter | 251—264 |
| 1,126,395 | 1/15 | Clark | 251—193 XR |
| 2,025,665 | 12/35 | Dickinson | 251—228 |
| 2,217,834 | 10/40 | Corbin | 137—329.01 |

FOREIGN PATENTS

| 1,195,746 | 1959 | France. |
|---|---|---|
| 290,380 | 1916 | Germany. |
| 901,250 | 1954 | Germany. |
| 344,337 | 1936 | Italy. |

ISADOR WEIL, *Primary Examiner.*